United States Patent
Hirata et al.

(10) Patent No.: US 10,690,311 B2
(45) Date of Patent: Jun. 23, 2020

(54) HEADLIGHT DEVICE

(71) Applicant: MAXELL, LTD., Kyoto (JP)

(72) Inventors: Koji Hirata, Kyoto (JP); Toshinori Sugiyama, Kyoto (JP); Yasuhiko Kunii, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 16/480,923

(22) PCT Filed: Dec. 12, 2017

(86) PCT No.: PCT/JP2017/044494
§ 371 (c)(1),
(2) Date: Jul. 25, 2019

(87) PCT Pub. No.: WO2018/139081
PCT Pub. Date: Aug. 2, 2018

(65) Prior Publication Data
US 2019/0390836 A1 Dec. 26, 2019

(30) Foreign Application Priority Data
Jan. 27, 2017 (JP) ................. 2017-012906

(51) Int. Cl.
*F21V 9/14* (2006.01)
*F21S 41/64* (2018.01)
(Continued)

(52) U.S. Cl.
CPC ............. *F21S 41/645* (2018.01); *F21S 41/13* (2018.01); *F21S 41/141* (2018.01); *F21S 41/285* (2018.01); *F21V 9/14* (2013.01)

(58) Field of Classification Search
CPC ........ F21S 41/645; F21S 41/13; F21S 41/141; F21S 41/285; F21S 41/00; F21S 45/00; F21S 43/00; F21V 9/14; B60Q 1/26
(Continued)

(56) References Cited

U.S. PATENT DOCUMENTS

| 10,571,090 B2 * | 2/2020 | Toko ............. F21S 41/645 |
| 2003/0189839 A1 * | 10/2003 | Shikano ........... F21S 41/135 |
| | | 362/509 |

(Continued)

FOREIGN PATENT DOCUMENTS

| JP | 2004-273180 A | 9/2004 |
| JP | 2008-532250 A | 8/2008 |

(Continued)

OTHER PUBLICATIONS

International Search Report for PCT/JP2017/044494, dated Mar. 13, 2018.

*Primary Examiner* — Ali Alavi
(74) *Attorney, Agent, or Firm* — Volpe and Koenig, P.C.

(57) ABSTRACT

A vehicle headlight device attached to a part of a vehicle and configured to apply illumination light to a road surface on which the vehicle runs comprises: a light source device configured to Generate the illumination light; an optical unit disposed on a light axis of the light source device and configured to project the illumination light from the light source device so as to form a desired light distribution; and a polarization direction conversion device disposed in a part of a light path between the light source device and the optical unit and being able to control the illumination light from the light source device with inclusion of conversion of a polarization direction thereof for each irradiation region in accordance with a state of a position irradiated with the illumination light on the road surface.

17 Claims, 16 Drawing Sheets

(51) Int. Cl.
*F21S 41/13* (2018.01)
*F21S 41/141* (2018.01)
*F21S 41/20* (2018.01)

(58) Field of Classification Search
USPC .......................................................... 362/19
See application file for complete search history.

(56) References Cited

U.S. PATENT DOCUMENTS

| | | | |
|---|---|---|---|
| 2004/0174594 A1* | 9/2004 | Shikano | F21S 41/135 |
| | | | 362/1 |
| 2004/0174712 A1 | 9/2004 | Yagi | |
| 2008/0029701 A1* | 2/2008 | Onozawa | G01S 7/493 |
| | | | 250/332 |
| 2008/0043466 A1* | 2/2008 | Chakmakjian | F21V 5/007 |
| | | | 362/237 |
| 2008/0291689 A1 | 11/2008 | Ajiki et al. | |
| 2009/0034278 A1* | 2/2009 | Tessnow | F21S 41/153 |
| | | | 362/511 |
| 2011/0280032 A1* | 11/2011 | Kishimoto | F21S 41/176 |
| | | | 362/538 |
| 2012/0155102 A1 | 6/2012 | Melzner et al. | |
| 2016/0138780 A1* | 5/2016 | Oh | F21S 41/17 |
| | | | 362/19 |
| 2017/0144591 A1 | 5/2017 | Yatsu | |
| 2018/0009374 A1* | 1/2018 | Kim | B60Q 1/2607 |
| 2018/0142842 A1* | 5/2018 | Schwaiger | F21S 41/176 |
| 2019/0078749 A1* | 3/2019 | Toko | F21S 41/645 |

FOREIGN PATENT DOCUMENTS

| | | |
|---|---|---|
| JP | 2008-293852 A | 12/2008 |
| JP | 2013-502679 A | 2/2011 |
| JP | 2011-233305 A | 11/2011 |
| JP | 2015-024666 A | 2/2015 |
| JP | 2015-207390 A | 11/2015 |
| WO | 2015/193996 A1 | 12/2015 |

* cited by examiner (a)

(b)

(a)

(b)

(a)

(b)

(a)

(b)

(a)

(b)

(a)

White mode
[Voltage : OFF]

(b)

Black mode
[Voltage : ON]

(a)

(b)

REFLECTANCE OF GLASS FOR
P-POLARIZED LIGHT AND S-POLARIZED LIGHT (a)

(b)

(a)

(b)

(a)

(b)

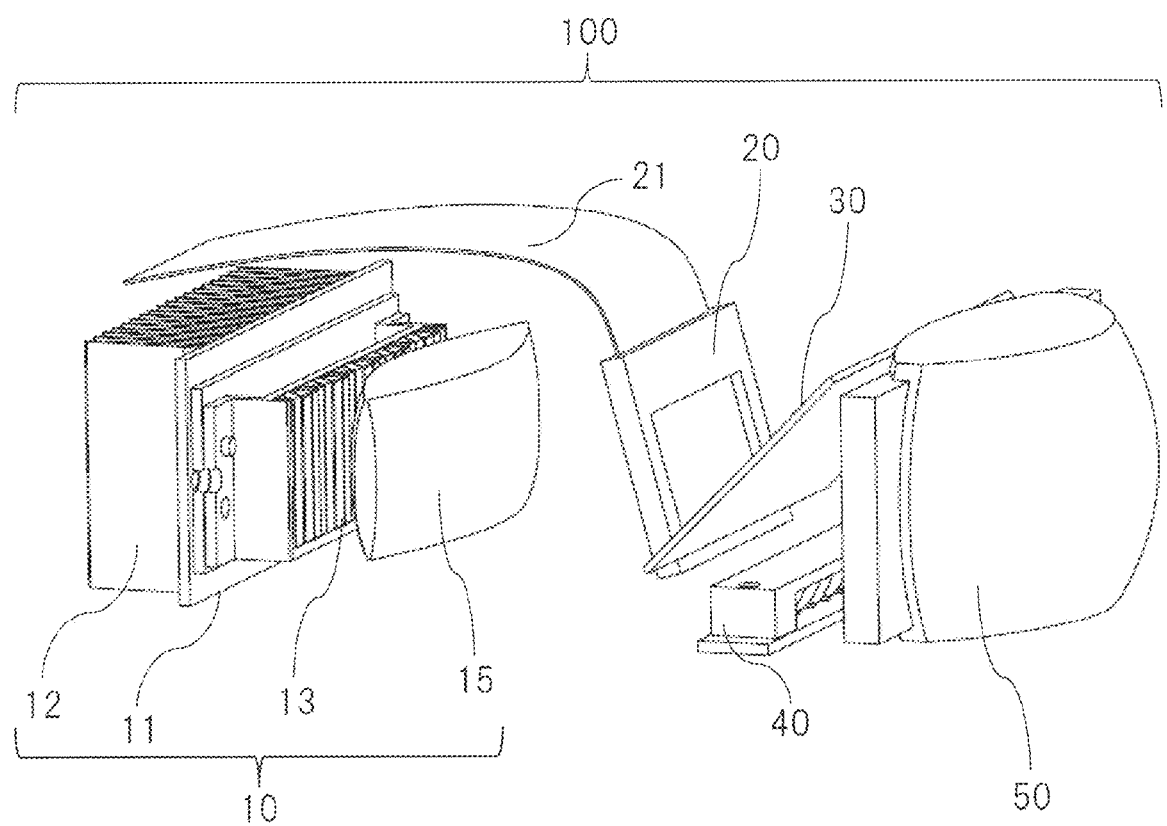

HEADLIGHT DEVICE

TECHNICAL FIELD

The present invention relates to a vehicle headlight device using a solid light emitting element.

BACKGROUND ART

With the remarkable development of a solid light emitting element such as LED in recent years, a lighting device using the solid light emitting element as a light source has been widely used in various types of lighting equipment as a small-sized, light-weight, low power consumption and long-life light source excellent for environmental protection, and such a lighting device has been used also as a vehicle headlight device excellent in visibility in which various types of control are possible as an on-vehicle electronic device.

For example, as a conventional vehicle headlight device, a vehicle headlamp comprising: a low-beam LED light source array; a high-beam LED light source array; a first optical light guide configured to receive low-beam light and high-beam light from these LED light sources to collimate them; and a second optical light guide configured to diffuse the collimated low-beam light and high-beam light as a combination of diffusion patterns, wherein these arrays and optical light guides are mechanically supported in a casing has already been known by the following Patent Document 1.

Also, according to the Patent Document 2, as a vehicle lamp using a laser light source as a light source and capable of adjusting brightness with a simple configuration, a vehicle lamp using a liquid crystal unit is disclosed. Specifically, a non-modulation region capable of transmitting laser light and a modulation region which changes a phase of a polarization component of the laser light by 90 degrees are formed in the liquid crystal unit, and the brightness of the peripheral light is adjusted by adjusting the ranges of the modulation region and the non-modulation region by a liquid crystal driver.

In addition, according to the following Patent Document 3, a LED lighting equipment, in particular, a LED headlight which uses a plurality of LEDs as an active light source and is configured to emit the light from the active light source with a predetermined orientation through a collimation optical unit, a mixing optical unit, a field optical unit and others is disclosed. Also, claim 25, the paragraph [0036] and others particularly describe that an optical element such as a lens or reflector for polarization or reformation may be further disposed as means for making the light emitted from the active light source reach the mixing optical unit with a desired form.

RELATED ART DOCUMENTS

Patent Documents

Patent Document 1. Japanese Patent Application Laid-open Publication No. 2008-532250

Patent Document 2: Japanese Patent Application Laid-open Publication No. 2015-207390

Patent Document 3: Japanese Patent Application Laid-open Publication No. 2013-502679

SUMMARY OF THE INVENTION

Problems to be Solved by the Invention

With the improvement in light emission efficiency, the LED which is a solid light source has been effectively used as a light emission source in a vehicle headlamp device. However, in the conventional technologies and the Patent Document 1 mentioned above, the light use efficiency characteristics and uniform lighting characteristics are still insufficient and there are various kinds of rooms for improvement.

Also, in the Patent Document 2, the non-modulation region and the modulation region are formed in the liquid crystal unit in advance, and the brightness of the peripheral light is adjusted by adjusting the ranges of the modulation region and the non-modulation region by the liquid crystal driver, but there is no description for obtaining illumination light excellent in visibility with the inclusion of the polarization component thereof in accordance with the state of the region irradiated with the illumination light. Also, in the Patent Document 3, an optical element such as polarization lens or reflector is used as means for making the light emitted from the active light source reach the mixing optical unit with a desired form, but there is no description for obtaining illumination light excellent in visibility with the inclusion of the polarization component.

Thus, an object of the present invention is to provide a vehicle headlight device, which has high use efficiency of light emitted from a LED light source and uniform lighting characteristics by the use of a light source device easily used as a modularized planar illumination light source and can generate and apply illumination light excellent in visibility by controlling the light with the inclusion of the polarization component thereof in accordance with the state of a road surface to be irradiated with the light.

Means for Solving the Problems

As an embodiment for achieving the object described above, the present invention provides a vehicle headlight device attached to a part of a vehicle and configured to apply illumination light to a road surface on which the vehicle runs, the vehicle headlight device comprising: a light source device configured to generate the illumination light; an optical unit disposed on a light axis of the light source device and configured to project the illumination light from the light source device so as to form a desired light distribution; and a polarization direction conversion device disposed in a part of a light path between the light source device and the optical unit and being able to control the illumination light from the light source device with inclusion of conversion of a polarization direction thereof for each irradiation region in accordance with a state of a position irradiated with the illumination light on the road surface.

Effects of the Invention

According to the present invention, by using a light source device which can be manufactured at low cost, is small-sized and easily modularized, and has high light use efficiency, it is possible to achieve the remarkable effect of providing a low power consumption and long-life vehicle headlight device excellent for environmental protection, the vehicle headlight device being able to control a polarization direc-

BRIEF DESCRIPTIONS OF THE DRAWINGS

Figure 1:
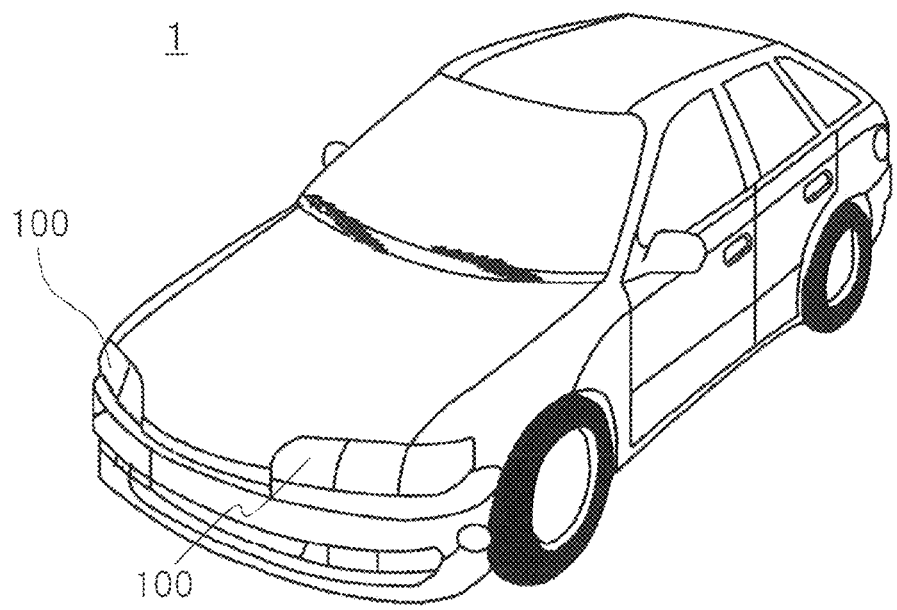
FIG. 1(a) is a perspective view showing an overall configuration in which a vehicle headlight device according to an embodiment of the present invention is applied as a headlamp of an automobile and FIG. 1(b) is a perspective view showing a part of the configuration in an enlarged manner.
Figure 1:
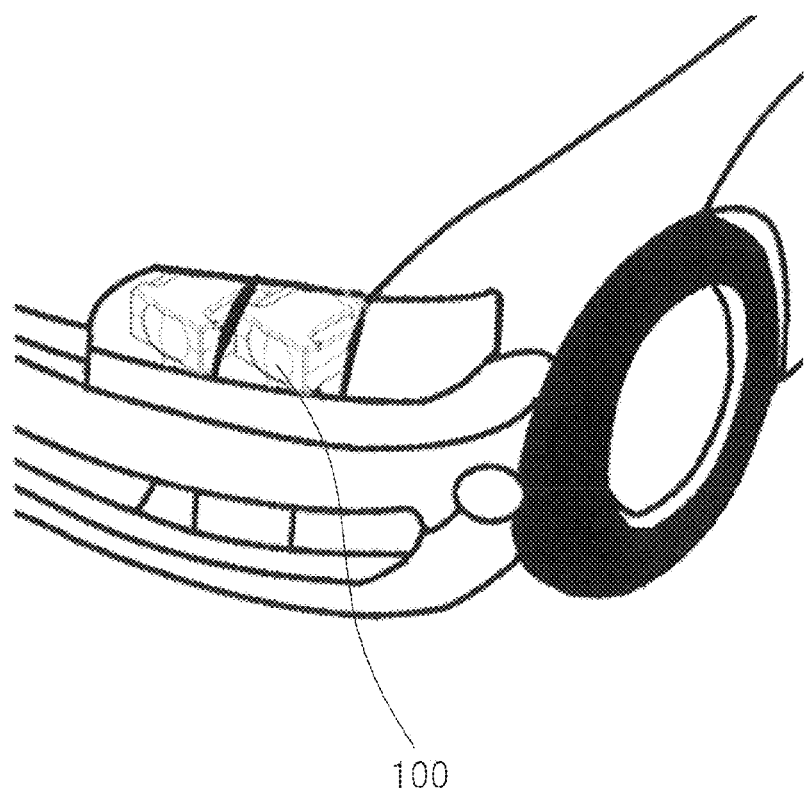

FIG. 17(a) is a developed perspective view showing an internal configuration of a vehicle headlight device according to a third embodiment of the present invention and FIG. 17(b) is a cross-sectional view thereof; and FIG. 18 is a developed perspective view in the case where a visible light lighting unit is small with respect to a LCD panel as a modification (fourth embodiment) of the headlight device of the present invention.

DETAILED DESCRIPTION OF PREFERRED EMBODIMENTS

Hereinafter, embodiments of the present invention will be described in detail with reference to the attached drawings. Note that the present invention is not limited to the following descriptions and can be changed and modified in various ways by a person having ordinary skill in the art within a range of a technical idea disclosed in this specification. Also, components having the same function are denoted by the same reference characters throughout the drawings for describing the present invention, and the repetitive description thereof will be omitted in some cases.

First, in FIG. 1, a vehicle 1 in which a vehicle headlight device using a solid light emitting element according to an embodiment of the present invention is mounted is shown in a perspective view and a partially enlarged view thereof. FIG. 1(a) shows an overall configuration of the vehicle 1 in which a vehicle headlight device 100 according to the present invention is mounted and FIG. 1(b) shows an enlarged view of a part of the vehicle headlight device.

Figure 2:
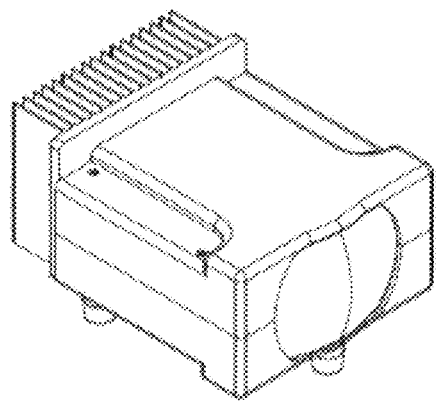
FIG. 2(a) is a perspective view showing an overall configuration of the vehicle headlight device according to the embodiment of the present invention and FIG. 2(b) is a perspective view showing a developed configuration of the headlight device.
Figure 2:
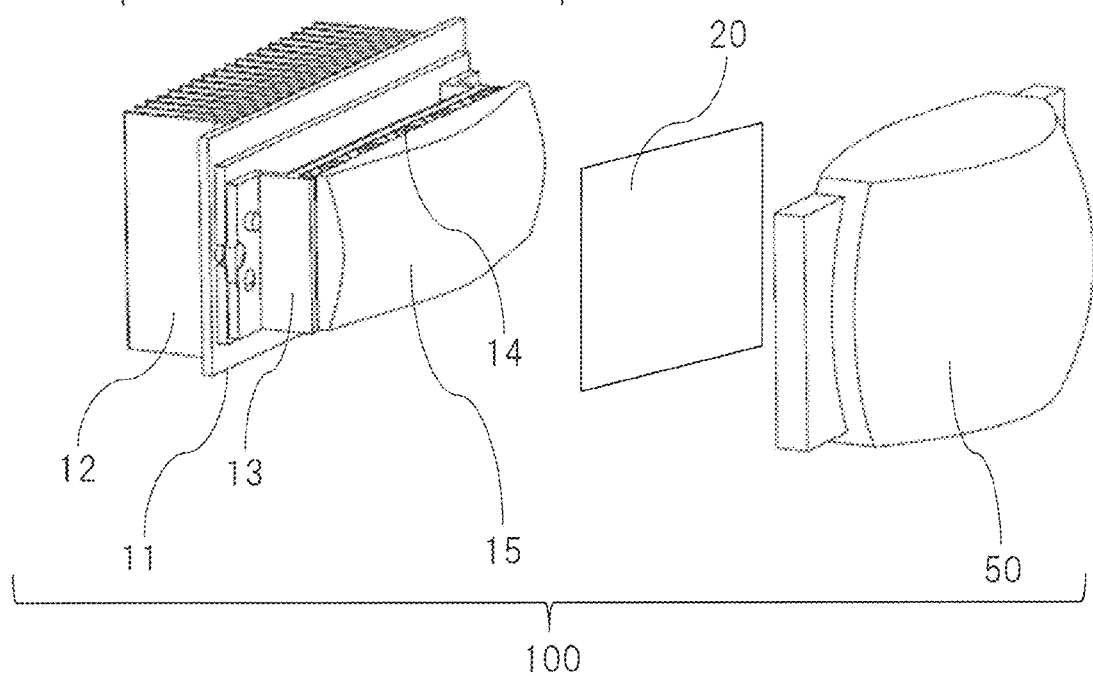
Figure 3:
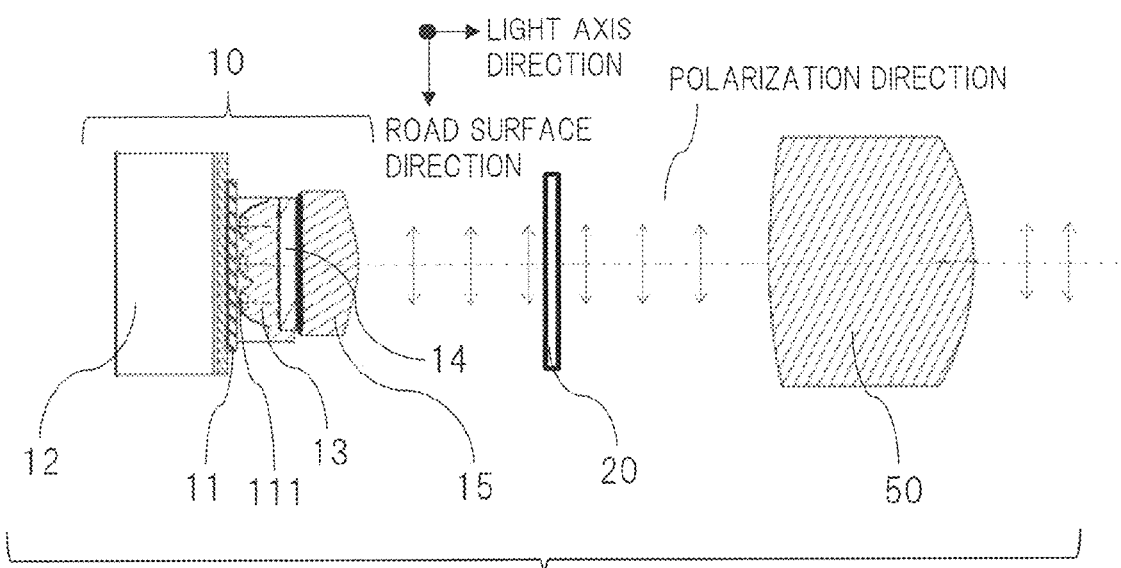
FIG. 3(a) is a side cross-sectional view showing the overall configuration of the vehicle headlight device according to the first embodiment of the present invention and FIG. 3(b) is a side cross-sectional view showing an overall configuration of a vehicle headlight device according to a modification.
Figure 3:
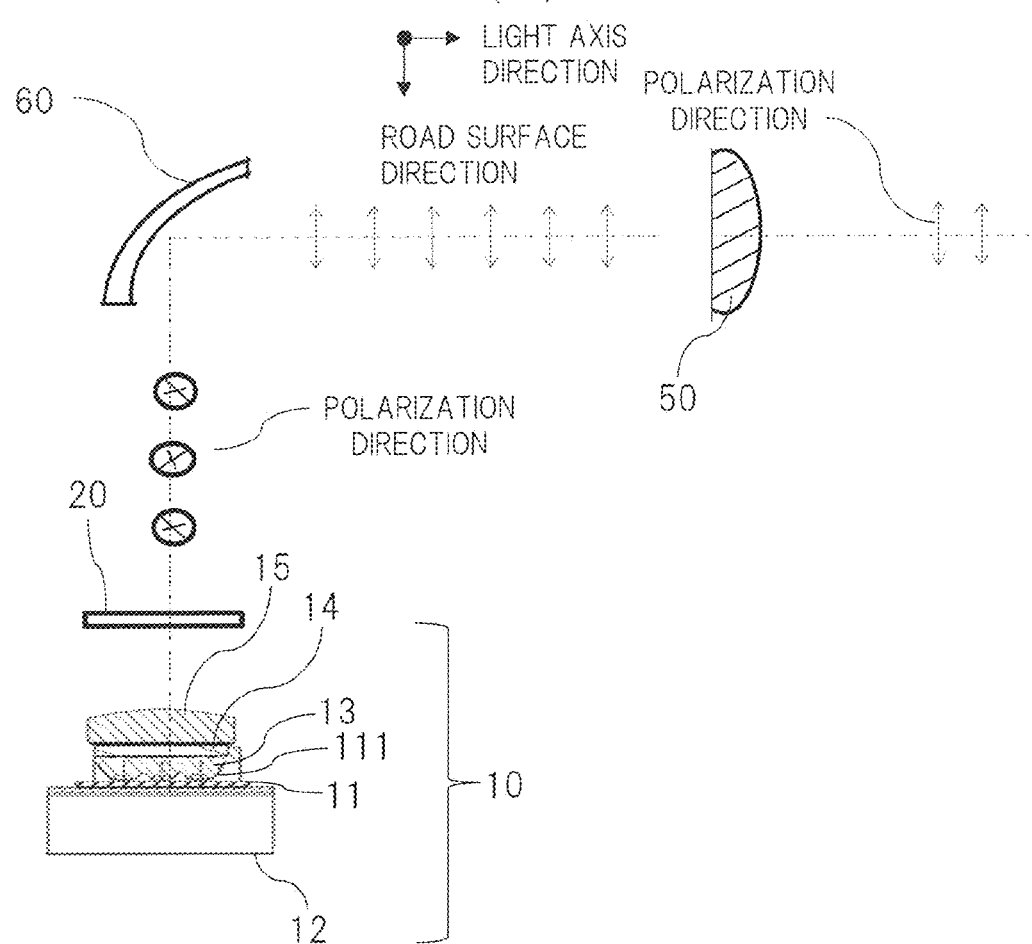

FIG. 2(a) is an overall perspective view of the headlight device 100 shown in FIG. 1(b), and FIG. 2(b) shows an internal configuration thereof in a developed manner. Also, FIG. 3(a) shows a side cross section of the headlight device 100, and FIG. 3(b) shows a side cross section of a headlight device according to a modification.

First Embodiment

As shown in these figures, the headlight device 100 is basically configured of a visible light lighting unit 10 which is the light source device and a so-called projection lens 50 which is an optical system for applying the illumination light emitted from the lighting unit to a front space of the vehicle 1 and a road surface on which the vehicle 1 runs. Further, a projection optical system may be configured by using a reflection mirror 60 instead of the projection lens 50, or the optical system may be configured of both of the projection lens 50 and the reflection mirror 60 as shown in FIG. 3(b).

Also, as can be seen from these figures, in the headlight device 100 according to the embodiment of the present invention, a polarization direction conversion device 20 configured to change (modulate) a polarization direction of illumination light from the visible light lighting unit 10 is disposed in a part of a light path of the illumination light from the visible light lighting unit 10 along a light axis thereof. Note that, according to the structure shown in FIG. 3(*b*), by bending the irradiation light flux in a predetermined direction by the reflection mirror 60, further precise control of the irradiation direction and the intensity becomes possible by the degree of freedom in the shape of the reflection surface in comparison with the structure shown in FIG. 3(*a*).

Subsequently, details of the constituent requirements of the headlight device 100 according to the embodiment of the present invention described above will be described below.

<Visible Light Lighting Unit>

The visible light lighting unit 10 which is the light source device of the present invention includes a LED board 11 in which one or a plurality of semiconductor light source element LEDs (Light Emitting Diodes) which are solid light sources to be described later, a control circuit thereof and others are mounted on a front surface, and a heat sink 12 for dissipating heat generated from the LED to ambient air is attached to a rear surface of the board. Note that, in this embodiment, a total of 15 LEDs are arranged in a grid of 5 (horizontal)×3 (longitudinal) on the LED board 11. Further, a collimator unit 13 to be described later is attached on a light emission surface side of the LED board 11.

Figure 4:
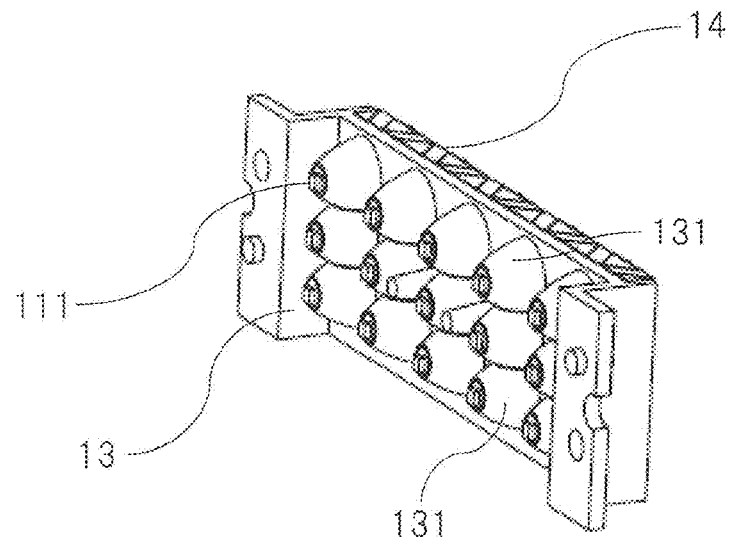
FIG. 4 is a perspective view showing a configuration of a visible light lighting unit centered around a collimator unit in the vehicle headlight device according to the first embodiment of the present invention.

As also shown in FIG. 4, this collimator unit 13 is configured by arranging collimators 131 (in this embodiment, 5 (horizontal)×(longitudinal)=15 collimators), which are provided so as to correspond to each of the one or plurality of LEDs 111 mounted on the LED board 11, on a surface inside a plate-like frame body.

Figure 5:
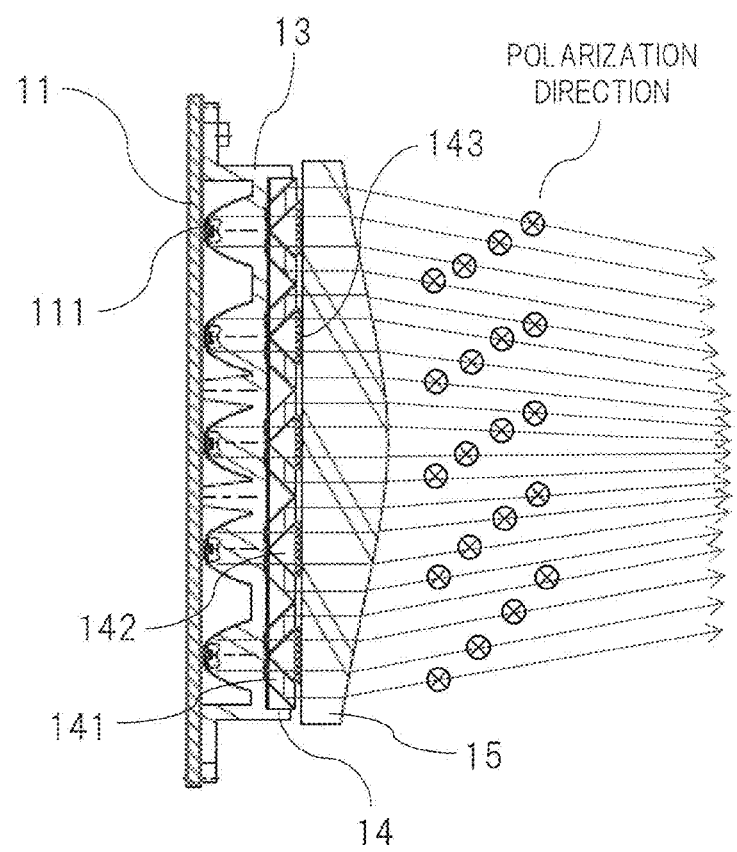
FIG. 5 is a top cross-sectional view showing an operation of the visible light lighting unit centered around the collimator unit in the vehicle headlight device according to the first embodiment of the present invention.
Figure 6:
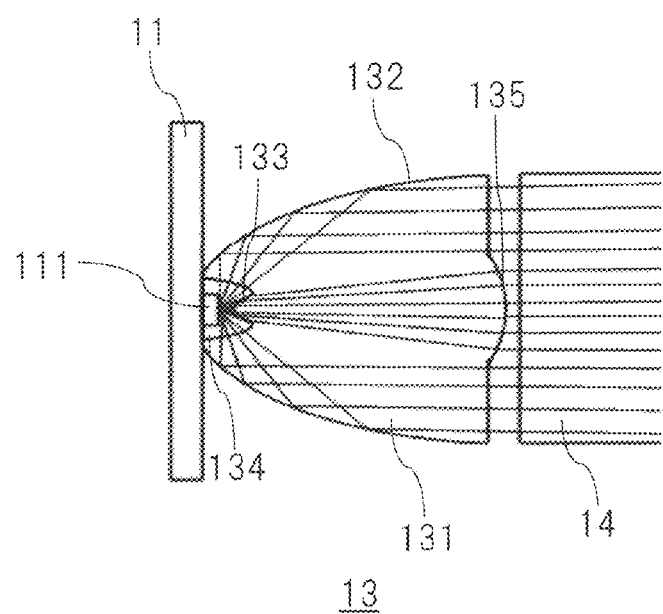
FIG. 6 is a partially enlarged cross-sectional view showing a structure and an operation of a collimator in the collimator unit in the vehicle headlight device according to the first embodiment of the present invention.

Note that each of the collimators 131 is formed of, for example, resin having the translucency and the heat resistance such as polycarbonate or silicone. Further, as also shown in FIGS. 5 and 6, each collimator 131 has a conical convex outer peripheral surface 132 obtained by rotating a substantially parabolic cross section, and a concave portion 134 having a convex portion (that is, convex lens surface) 133 at its central portion is formed at the top of the collimator 131. In addition, a convex lens surface projecting to outside (or a concave lens surface recessed to inside) 135 is formed at a central portion of a flat portion of the collimator 131. Note that the parabolic surface (outer peripheral surface) 132 forming the conical outer peripheral surface of the collimator 131 is set within an angle range capable of totally reflecting the light emitted in the peripheral direction from the LED 111 therein or a reflection surface is formed on the surface. The collimator described above can be easily manufactured at low cost by the general forming process.

On the other hand, the LED 111 is attached at a predetermined position on the front surface of the LED board 11 which is a circuit board to mount it, and as can be seen from the figure, the LED board 11 is disposed and fixed so that each LED 111 is located at the position of the central portion of the concave portion 134 of the corresponding collimator 131.

With the above-described configuration of the collimator 131, the light emitted from the central portion of the LED 111 in an upward direction (to the right in the figure) is collected to be parallel light by the two convex lens surfaces 133 and 135 formed on the surface of the collimator 131 to which the LED light is incident and the surface thereof from which the LED light is emitted as shown by arrows in the figure. Also, the light emitted from the other part in the peripheral direction is reflected by the parabolic surface (outer peripheral surface) 132 forming the conical outer peripheral surface of the collimator 131 and is then similarly collected to be parallel light. In other words, with the collimator 131 in which the convex lens is formed at the central portion thereof and the parabolic surface (outer peripheral surface) 132 is formed in the peripheral portion thereof, almost all of the light generated from the LED 111 can be taken as the parallel light. Consequently, the use efficiency of the generated light can be sufficiently improved.

Subsequently, as can be seen from the figure, a polarization conversion element 14 is attached to the front surface side of the collimator unit 13 described above, and a convex lens (surface having a degree of freedom in light distribution control, for example, a free-form surface is preferably used as a lens surface) 15 for controlling light distribution is further attached to the polarization conversion element 14. Note that, in this embodiment, specific polarized light is selected and used by the polarization conversion element 14.

More specifically, as can be seen from FIG. 5 described above, the polarization conversion element 14 is configured by combining a plurality of translucent members 141 having a columnar shape whose cross section is paralielogramic (hereinafter, parallelogram column) and a plurality of translucent members 142 having a columnar shape whose cross section is triangular (hereinafter, triangular column) so as to be arranged in an array in parallel to the plane perpendicular to the light axis of the parallel light from the collimator unit 13. Further, at the interfaces between the adjacent translucent members arranged in an array, a polarizing beam splitter (hereinafter, abbreviated as "PBS") film and a reflection film are alternately provided, and a half wave plate 143 is provided on an emission surface from which the light which has been incident on the polarization conversion element 14 and has passed through the PBS film is emitted.

The free-form surface lens 15 described above is disposed on the emission surface side of the polarization conversion element 14. In this free-form surface lens 15, the emission surface or the incident surface or both the emission surface and the incident surface are configured of the free-form surfaces. With this free-form surface lens 15, the illumination light having desired light intensity distribution can be obtained by controlling the emission direction of the light beam by the surface shape of the lens, for example, by intensifying the light distribution at the central portion so as to achieve the distant lighting as indicated by arrows in FIG. 5.

With the headlight device 100 having the visible light lighting unit 10 whose configuration has been described above in detail, the light emitted from the LED 111 is converted into substantially parallel light by the function of the collimator unit 13, and is then converted into linearly polarized light by the polarization conversion element 14. Further, after the light is changed and adjusted (controlled) as appropriate with the inclusion of the polarization direction thereof in accordance with the state of the road surface and the like by the polarization direction conversion device 20 to be described later in detail, the desired light intensity distribution is formed by the free-form surface lens 15, and the light is enlarged and projected by the projection lens 50 or the projection lens 50 and the reflection mirror 60 to be applied onto the space or road surface in front of the vehicle.

<Polarization Direction Conversion Device>

The polarization direction conversion device 20 is configured to realize the function of obtaining the light ideal for the driving scene of the vehicle by the control signal to be described later, that is, the function of changing and adjusting (controlling) the illumination light from the visible light lighting unit 10 with the inclusion of the polarization direction thereof in accordance with the state of the road surface or the like. More specifically, in this embodiment, as shown in FIG. 7, the polarization direction conversion device 20 is configured of a TN (Twisted Nematic) LCD (Liquid Crystal Display), and the illumination light passing the surface position of the LCD corresponding to the road surface to which the illumination light from the visible light lighting unit 10 is applied is controlled with the inclusion of the polarization direction thereof.

Figure 7:
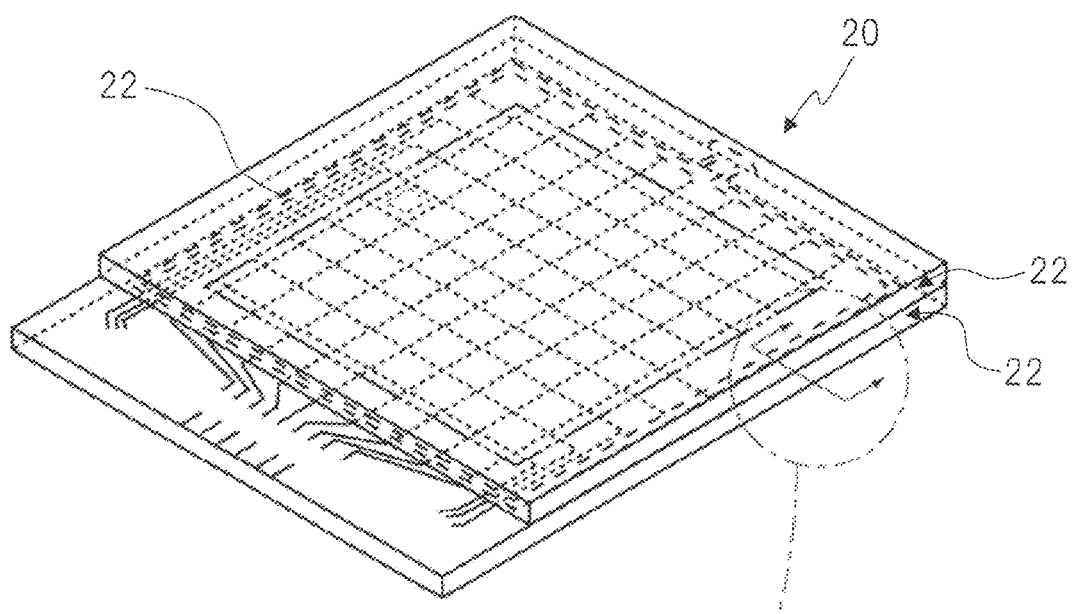
FIG. 7(a) is a developed perspective view showing an overall configuration of a polarization direction conversion device in the vehicle headlight device according to the first embodiment of the present invention and FIG. 7(b) is a partially enlarged cross-sectional view thereof.
Figure 7:
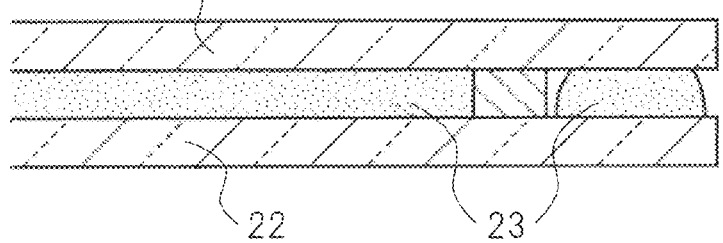

Specifically, as can be seen from FIGS. 7(*a*) and 7(*b*), the LCD panel constituting the polarization direction conversion device 20 is configured of a large number of (for example, 1920 (horizontal)×1080 (longitudinal)) pixels formed by interposing liquid crystal composition 23 between a pair of glass substrates 22 and 22 each having an alignment film formed on an opposing surface thereof, and the light incident on one surface is transmitted through each cell and emitted from the other surface. At that time, by applying a voltage (control signal) between the alignment films disposed so as to face each other in each pixel, the characteristics of the liquid crystal composition constituting each cell through which the light passes are changed, so that the change and adjustment with the inclusion of the desired polarization becomes possible.

Figure 8:
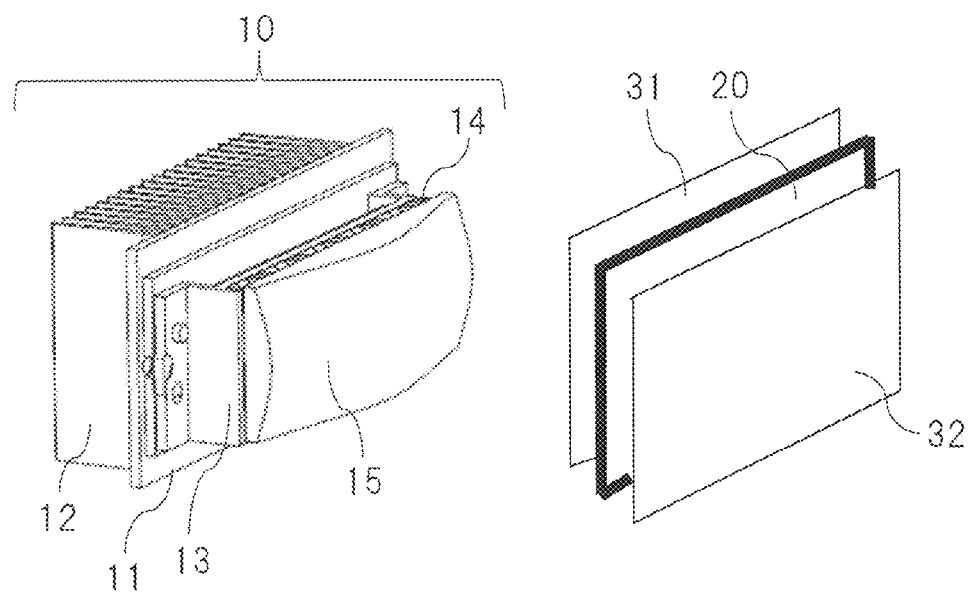
FIG. 8(a) is a diagram showing a layout configuration of the polarization direction conversion device in the vehicle headlight device according to the first embodiment of the present invention and FIG. 8(b) is a diagram showing a layout configuration according to a modification thereof.
Figure 8:
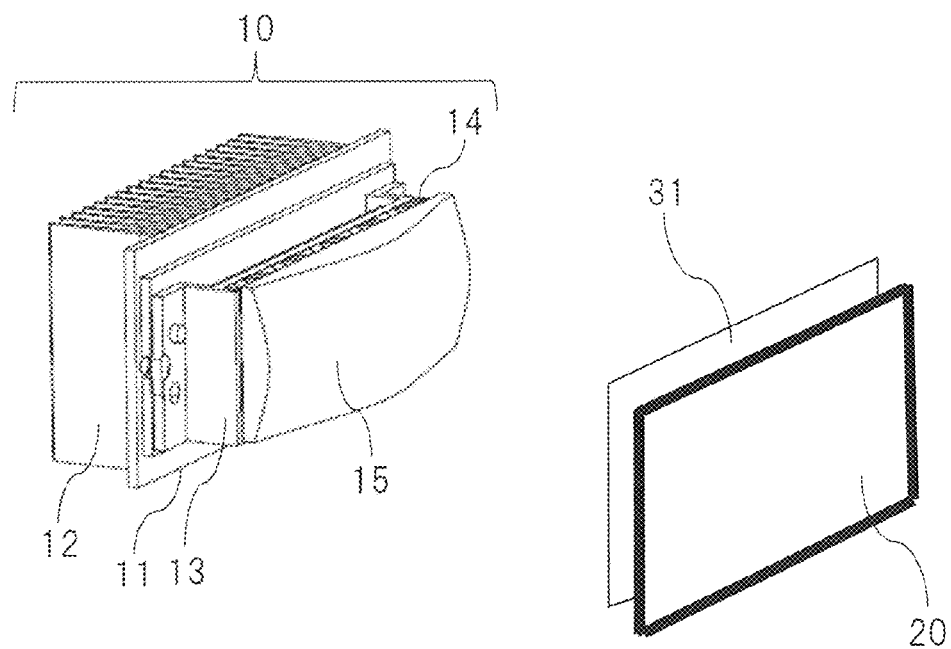

FIG. 8(*a*) shows a configuration in which polarization plates 31 and 32 are disposed in front of and at the back of the LCD panel 20 as with the case in which the normal TN LCD panel is used. As shown in the figure, the LCD panel 20 is disposed on the light path of the illumination light from the visible light lighting unit 10 serving as a light source device. In this embodiment, in order to improve the contrast capability of the obtained video, a polarization plate 31 (referred to as an incident-side polarization plate) for improving the degree of polarization by transmitting p-polarized light is disposed at a position where the illumination light flux is incident. Similarly, a polarization plate 32 (referred to as an emission-side polarization plate) that absorbs p-polarized light is disposed on the light emission side of the LCD panel 20. As a result, the degree of polarization of the p-polarized light flux generated in the light source device can be improved by the incident-side polarization plate 31, and the high contrast capability can be obtained by the polarization direction conversion function of the LCD panel. Also, FIG. 8(*b*) shows a configuration according to a modification in which the emission-side polarization plate 32 on the back side is removed from the LCD panel 20 having the configuration described above.

Figure 9:
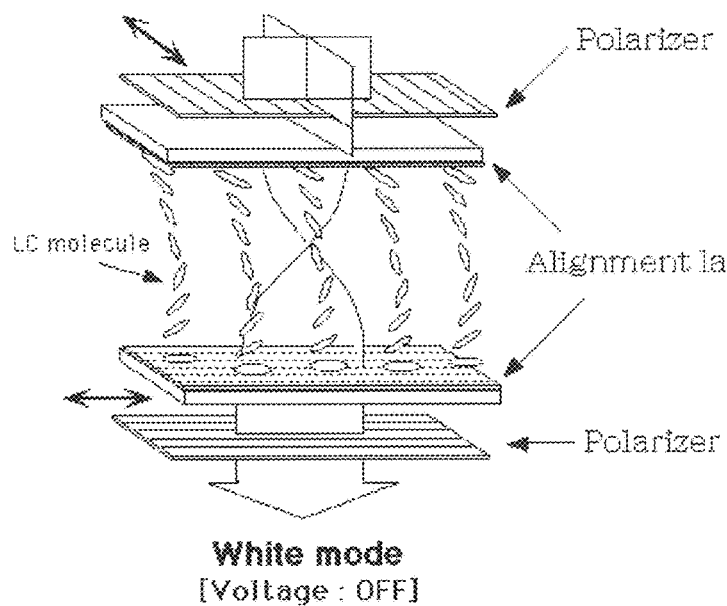
FIG. 9(a) is a state diagram at the time when no voltage is applied for describing the operation of the polarization direction conversion device in the vehicle headlight device according to the first embodiment of the present invention and FIG. 9(b) is a state diagram at the time when a voltage is applied for describing the operation thereof.
Figure 9:
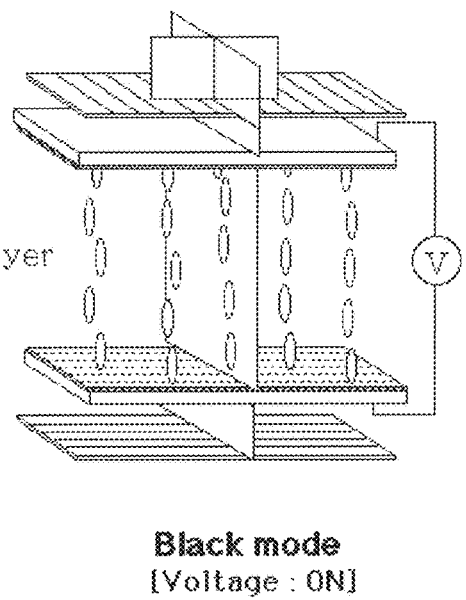

A conversion function (operation) of the polarization direction of the incident light in each pixel in the polarization direction conversion device 20 configured of the TN LCD panel described above will be described below with reference to FIG. 9.

With the polarization direction conversion device 20 configured of the TN LCD panel described above, as shown in FIG. 9(*a*), each pixel has a function of rotating the polarization direction when no voltage is applied between the alignment films thereof, and for example, p-polarized light is converted to s-polarized light (see outline arrow in the figure) and passes the emission-side polarization plate 32 (so-called white mode). Meanwhile, as shown in FIG. 9(*b*), when a predetermined voltage (V) is applied, the polarization direction is not changed. Therefore, the light which remains p-polarized light is blocked by the emission-side polarization plate 32 (so-called black mode).

Therefore, the polarization direction conversion device 20 according to the embodiment of the present invention, by setting the transmittance (polarization degree) of p-polarized light in the emission-side polarization plate 32 to be large, that is, setting the light shielding rate of p-polarized light to be low (adjusting it as appropriate), the light which remains p-polarized light can also be obtained on the emission side. As an example thereof, the transmittance of the p-polarized light of the emission-side polarization plate 32 when the control to transmit or block the light is performed is preferably set within a range from 0.01 to 0.1%. Also, in order to achieve both polarization conversion and contrast (transmittance/absorptance), the transmittance of the p-polarized light is preferably in a range from 1 to 40%, and when the purpose is the polarization conversion, the transmittance of the p-polarized light is preferably 80° or higher and the emission-side polarization plate 32 may be unnecessary as shown in FIG. 8(*b*). Alternatively, it is also possible to adopt the structure in which the emission-side polarization plate 32 is not provided (is removed) on the emission side of the LCD panel as shown in FIG. 8(*b*).

With the polarization direction conversion device 20 described above, an angle with which the specific incident polarized light is rotated (twisted) is changed by the voltage applied to the alignment films of each pixel constituting the TN LCD panel, so that the illumination light flux applied to the road surface can be selected (controlled) as appropriate in accordance with the state of the road surface. As a result, the transmittance of the emission-side polarization plate 32 is changed, and the intensity of the illumination light flux is changed in accordance with the applied voltage. Namely, the illumination light flux applied to the road surface can be controlled as appropriate with the inclusion of the polarization direction thereof in accordance with the irradiation position thereof (that is, position of the pixel constituting the LCD panel), and the superior illumination light capable of improving the visibility of the driver can be obtained.

Namely, with the TN LCD panel (normally white panel) used as the polarization direction conversion device, the polarization direction is rotated when no voltage is applied and p-polarized light is converted into the s-polarized light, and the polarization direction is not changed when a predetermined voltage is applied. Further, since the angle with which the specific incident polarized light is rotated (twisted) is changed by the applied voltage, the light can be controlled with the inclusion of the polarization direction of the illumination light flux in accordance with the applied voltage by appropriately setting the polarization degree (ratio of transmittance of the specific polarized light and transmittance of the other polarized light) of the polarization plate on the emission side (or providing no polarization plate on the emission side). For the convenience of description, the TN liquid crystal panel has been described, but a TFT (Thin Film Transistor) liquid crystal panel may be used as the polarization direction conversion device.

Next, the technology of controlling the polarization direction and light distribution characteristics of the headlight in accordance with a control signal generated according to a steering angle, an external signal from a front monitoring camera, and ON/OFF of a control device by the headlight device 100 according to the embodiment of the present invention provided with the polarization direction conversion device 20 described above will be described below.

Figure 10:
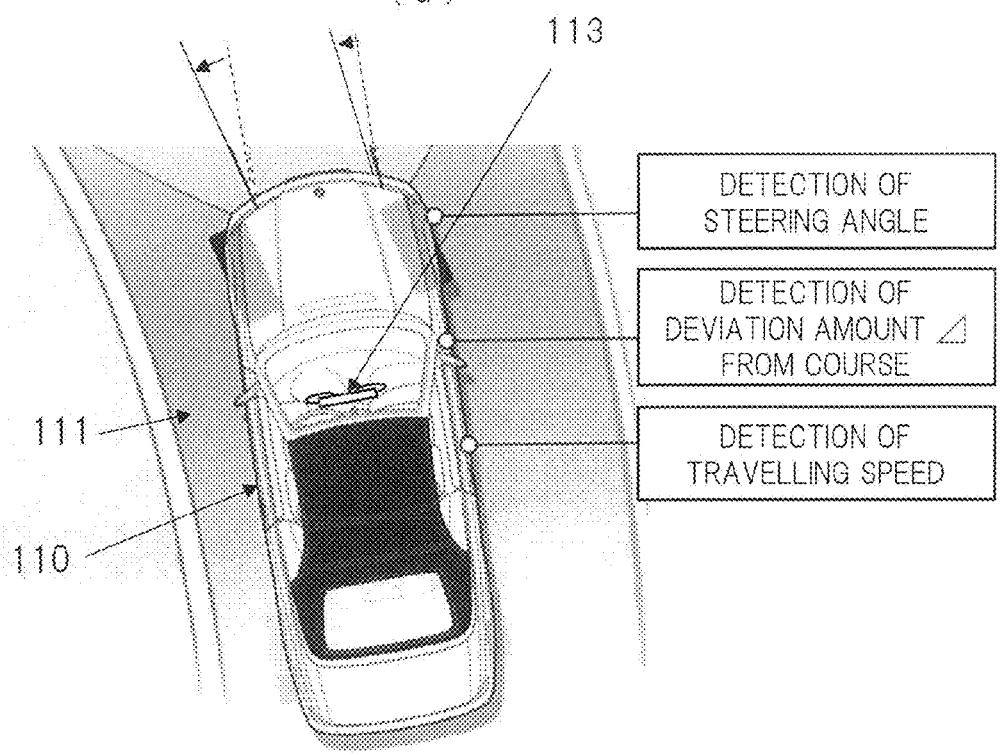
FIG. 10(a) is an explanatory diagram for the control of the headlight in the vehicle headlight device according to the first embodiment of the present invention and FIG. 10(b) is an explanatory diagram for the irradiation region of the headlight.
Figure 10:
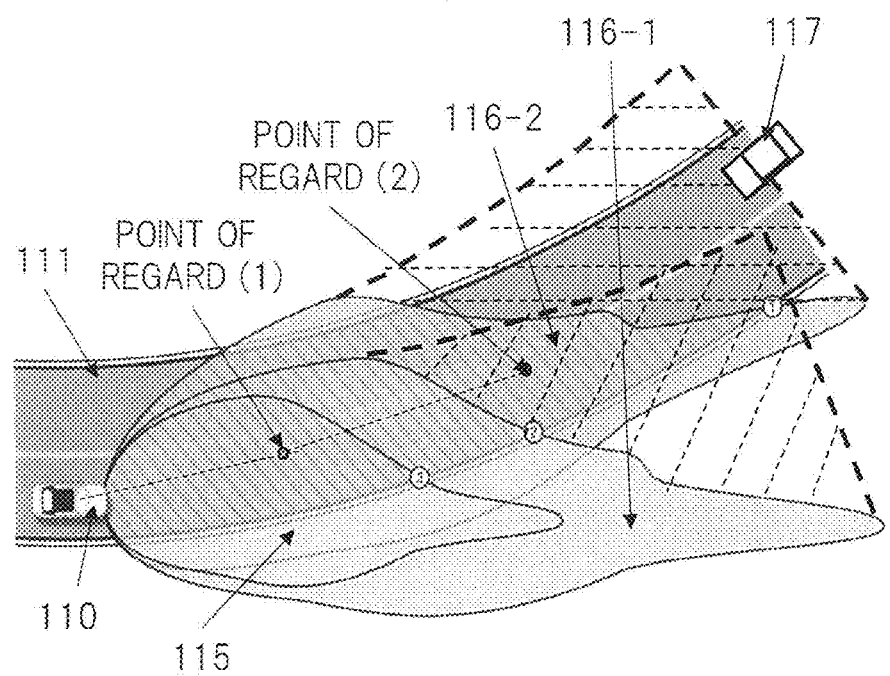

A method of controlling the brightness, the irradiation range, and the polarization degree of the headlight device of a moving automobile will be described with reference to FIG. 10. FIG. 10(*a*) is a top view of a moving automobile, and a reference character 113 denotes a forward-monitoring sensing camera, which detects the presence or absence of a preceding vehicle and an obstacle. In this embodiment, a vehicle headlight device automatically controls the irradiation range and the intensity of the irradiation light of the vehicle headlight device.

In the example shown in FIG. 10(b), the vehicle headlight device applies p-polarized light in a so-called low-beam region where a region close to an automobile is irradiated particularly when it is raining in order to reduce the reflection in water puddles on the road surface. Meanwhile, at the same time, the vehicle headlight device can apply s-polarized light in a distant region for visually recognizing a preceding vehicle and an obstacle present at a distance. In this manner, with the vehicle headlight device according to the embodiment of the present invention, it is possible to selectively apply the light of optimum polarization in the necessary light irradiation range, and as a result, the significant improvement in visibility can be expected.

Also, in the vehicle headlight device according to the embodiment of the present invention, by detecting the steering rotation angle and the movement of the point of regard by monitoring the position of the pupil of the driver with a camera, the irradiation region is automatically changed from 116-1 to 116-2 in accordance with them. At that time, by adjusting the light flux intensity (brightness) from the illumination device in accordance with the control signal, the irradiation intensity and the irradiation region of the light flux can be optimized even during the movement of the Point of view. The region indicated by broken lines in FIG. 10(b) shows the irradiation region in the case where the vehicle headlight device is lit without control.

Figure 11:
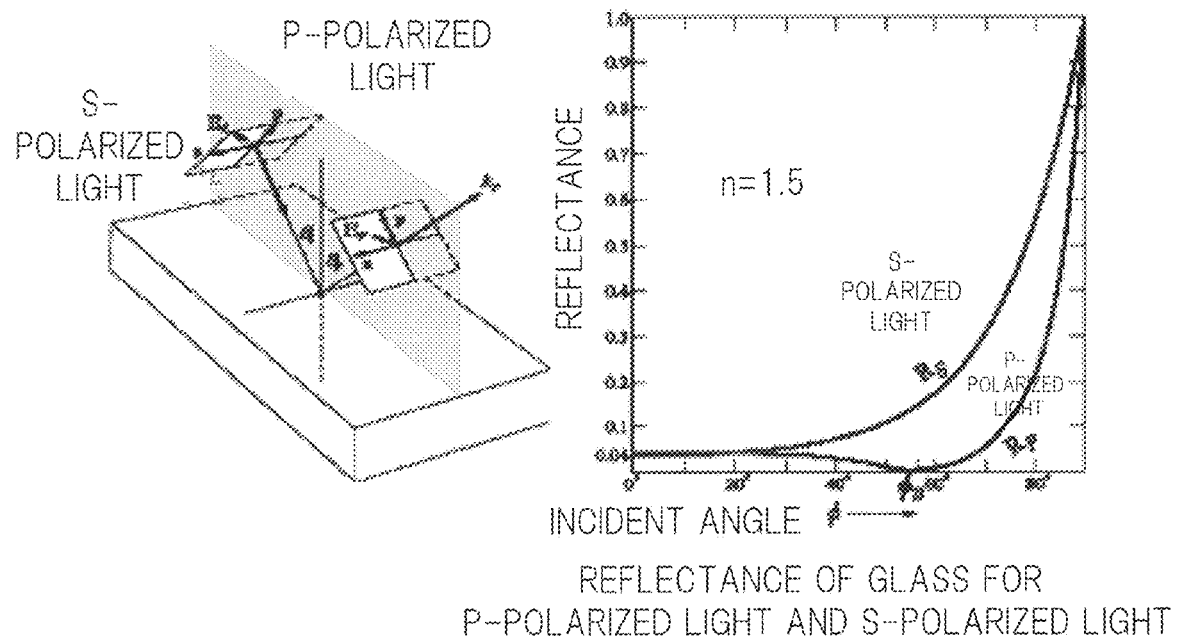
FIG. 11 is a diagram showing an example of angular characteristics of a reflectance of a substance having a refractive index of 1.5 for p-polarized light and s-polarized light in the vehicle headlight device according to the first embodiment of the present invention.

For example, for the purpose of suppressing the reflection of the illumination light from the light source device on the road surface and the reflection due to raindrops/fogs in the case of bad weather or the like, the configuration of converting the light into p-polarized light which is linearly polarized light oscillating in a plane perpendicular to the road surface is preferable. On the other hand, for improving the visibility of an object in a distant view during driving, it is preferable to apply s-polarized light having high reflectance as compared with p-polarized light as shown in FIG. 11. Namely, by selectively using specific polarized light in accordance with an irradiated object and a distance, a vehicle headlight device excellent in visibility in comparison with a conventional headlight which applies natural light can be realized.

As described above, with the vehicle headlight device above, it is possible to provide a low power consumption, long-life and highly functional vehicle headlight device excellent for environmental protection, which can be manufactured at low cost, is small-sized and easily modularized, and has high light use efficiency owing to adoption of LED, the vehicle headlight device being able to generate illumination light excellent in visibility by selectively applying suitable light with the inclusion of the optimum polarized light in the irradiation range. Namely, it is possible to provide a vehicle headlight device capable of obtaining the light ideal for the driving scene of the vehicle.

In addition to the control described above, in the embodiment of the present invention, the irradiation light, the irradiation region, and the polarization direction of the headlight are controlled in accordance with the control signal generated according to the steering angle, the external signal from a lane monitoring camera, and ON/OFF of the control device. As a result, the light is selectively changed between the conventional high-beam and low-beam. For example, the p-polarized light of less reflection is adopted as the irradiation light of the headlight device for the surface of water puddles on the road surface when it is raining, and the s-polarized light is adopted for easily visually recognizing a distant object.

In the foregoing, the major constituent requirements of the headlight device according to the embodiment of the present invention have been mainly described in detail, and other embodiments including the modification thereof will be described in detail below.

Second Embodiment

FIGS. 12(a) and 12(b) show a configuration in which a polarization mirror or a polarization plate 30 is further provided so as to be inclined on an emission side of a liquid crystal panel (LCD panel) which is the polarization direction conversion device 20 in the vehicle headlight device 100 whose basic configuration has been described above. With this configuration, by finely controlling the light distribution by controlling ON/OFF of the LCD panel constituting the polarization direction conversion device 20, the lighting with secured visibility of the distant place is possible while suppressing the glare to a vehicle traveling in the opposite lane or a vehicle traveling in the same lane. Furthermore, by using a color liquid crystal display element (specifically, providing a color filter on one side of a LCD panel glass substrate of FIG. 7 (not shown)) as the LCD panel constituting the polarization direction conversion device 20, information indicating the driving state including a travelling speed and a direction of its own vehicle and various types of information relating to the driving of other vehicles may be displayed on the road by using the illumination light not only in daytime but also in nighttime.

In these figures, the configuration in which the LCD panel 20 is disposed on a light path of the illumination light from the visible light lighting unit 10 serving as the light source device, more specifically, between the free-form surface lens 15 of the visible light lighting unit 10 and the projection lens 50 is shown. Also, a reference character 21 in the figure denotes a FPC (Flexible Printed Circuits) electrically connected to the LCD panel 20, and the LCD panel 20 is controlled by control signals input from a control circuit (not shown) through the FPC 21.

Incidentally, when the LCD panel 20 is provided in the vehicle headlight device 100, the burning due to irradiation of sunlight incident from the outside, the deterioration of the characteristics thereof and others are conceivable. Therefore, as a preventive measure, a polarization mirror 30 is further disposed between the LCD panel 20 and the projection lens 50 in this embodiment. Note that the same effect can be obtained when a reflective polarization plate is disposed instead of the polarization mirror 30 at the position described above.

Figure 12:
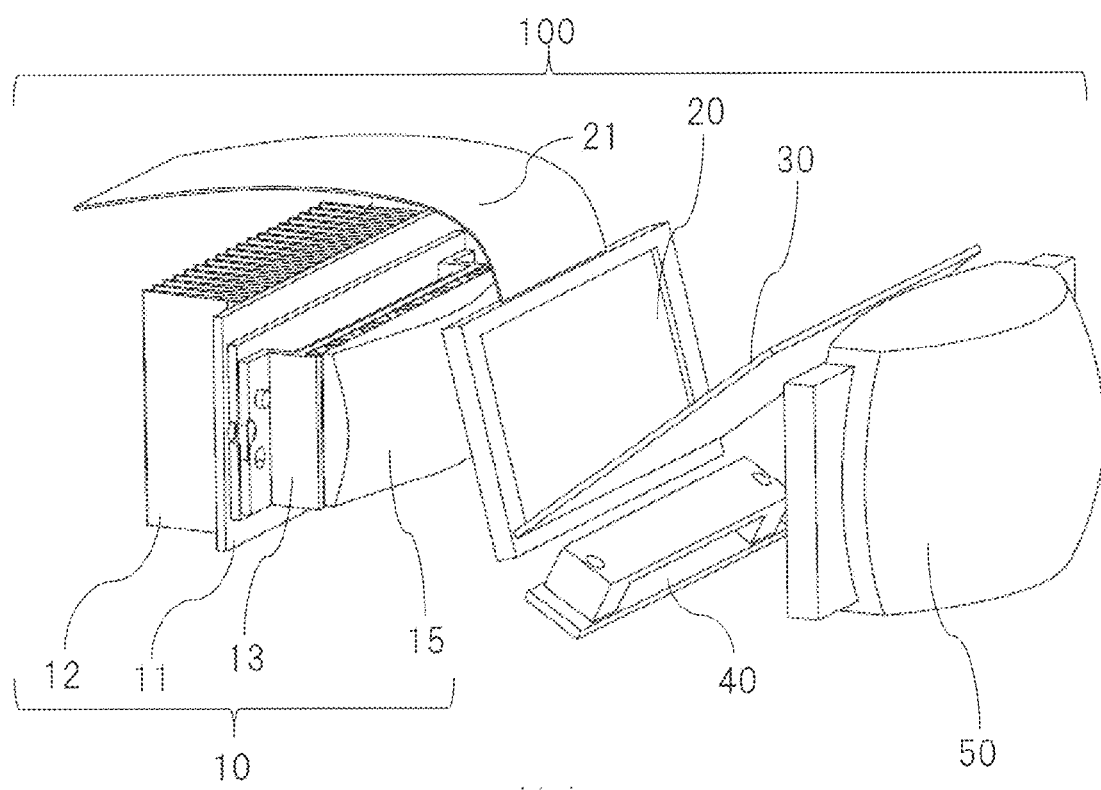
FIG. 12(a) is a developed perspective view showing an overall configuration of a vehicle headlight device according to a second embodiment of the present invention and FIG. 12(b) is a side cross-sectional view thereof.
Figure 12:
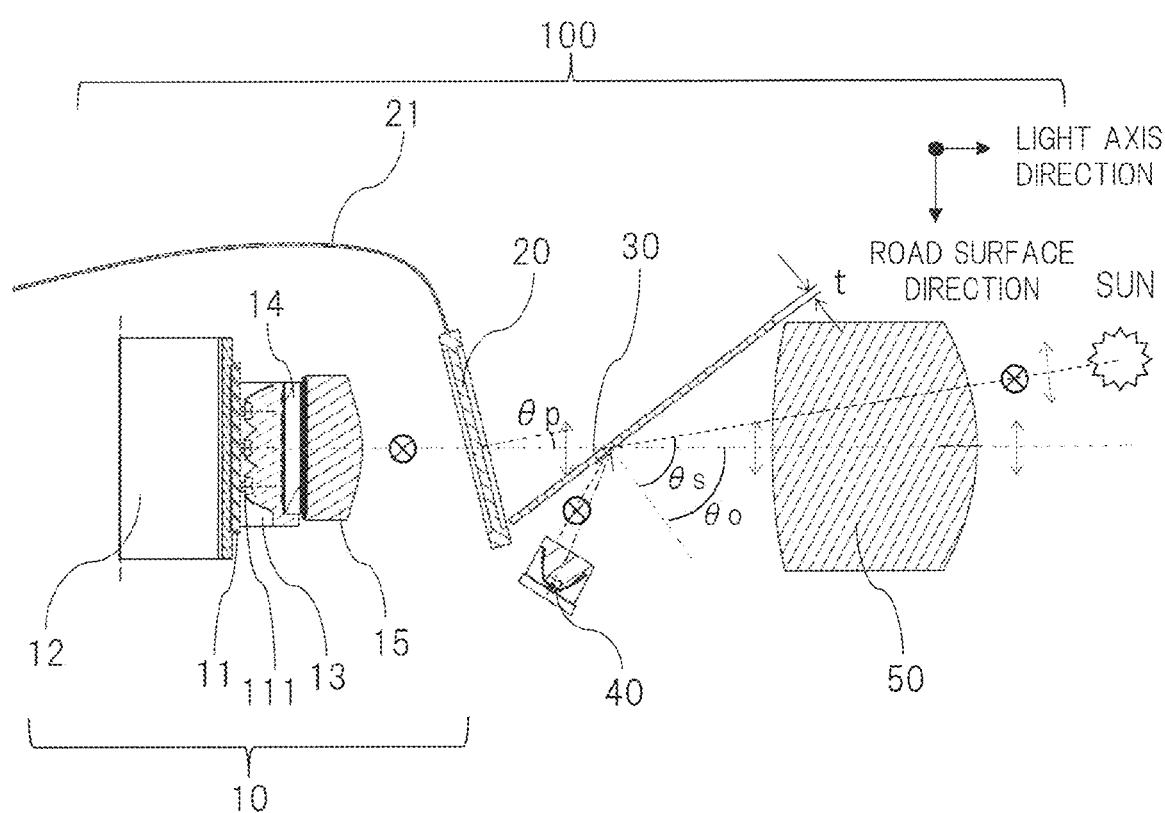

Next, when information is projected on the road surface, the distance of an image projected on the road surface through the projection lens 50 differs for each of the pixels of the LCD panel 20, and thus, the degradation in the focus performance is caused. Therefore, in order to reduce the defocus amount caused in the image projected on the road surface, the LCD panel is preferably disposed so as to be inclined with respect to the light axis. Accordingly, in this embodiment, as shown also in FIG. 12, the LCD panel 20 is disposed so that the emission surface thereof is inclined upward by an angle of θp (for example, 10 to 15 degrees) with respect to the light axis. Further, although the LCD panel 20 shown in FIG. 12 is inclined with respect to the light axis, the LCD panel is not necessarily inclined with respect to the light axis when the headlight device is used as a normal headlamp without displaying the information on the road surface.

Figure 13:
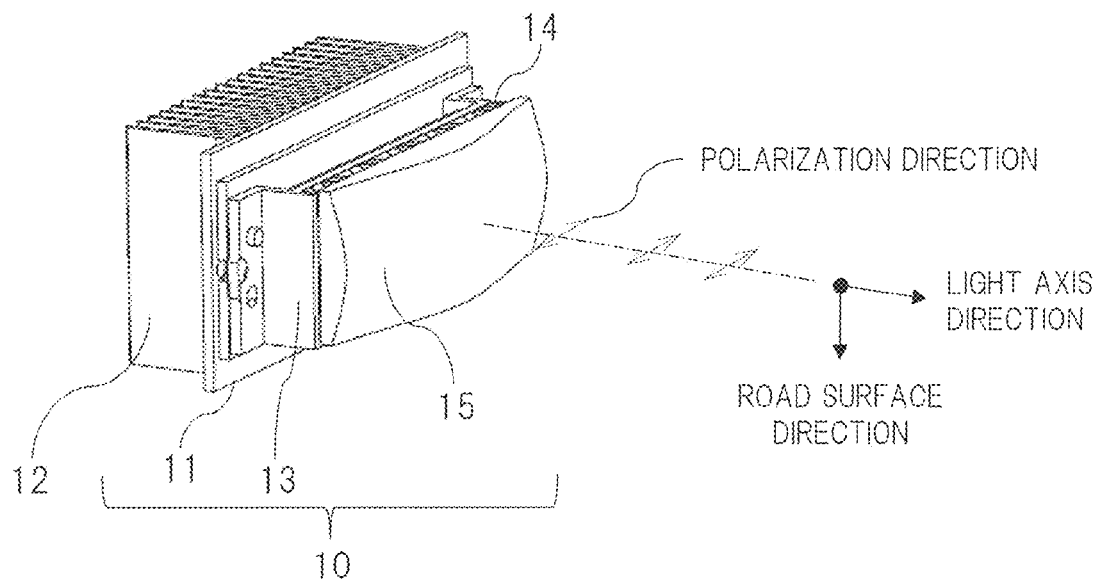
FIG. 13(a) is a perspective view for describing a polarization state of a visible light lighting unit in the vehicle headlight device according to the second embodiment of the present invention and FIG. 13(b) is a cross-sectional view thereof.
Figure 13:
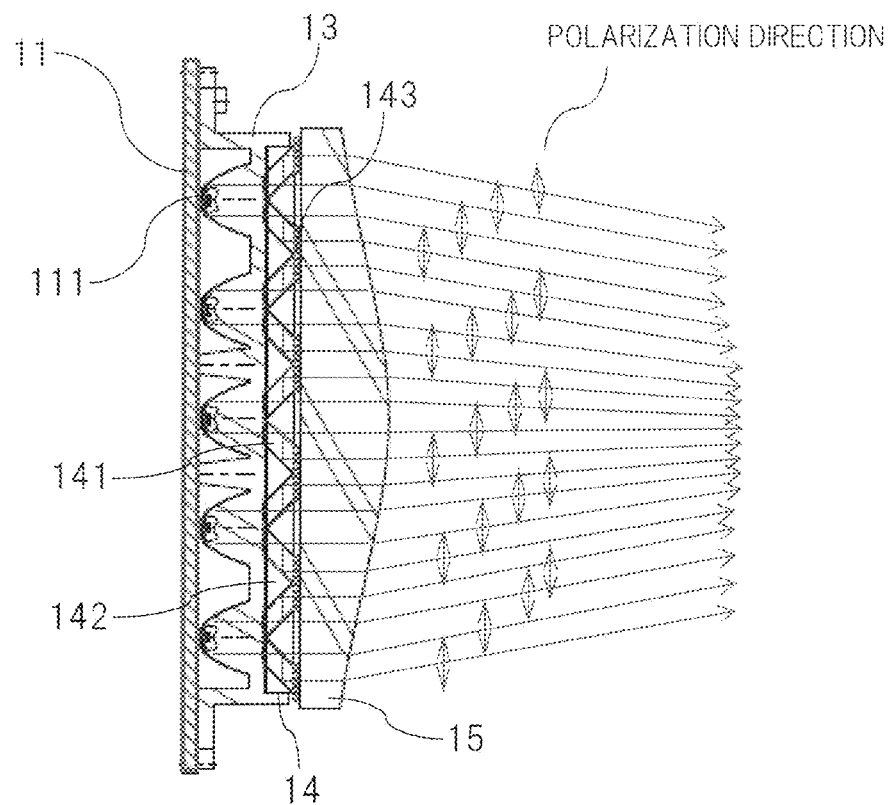

Further, at this time, the polarization direction of the light emitted from the LED 111 is rotated by 90 degrees when passing through the LCD panel 20. Therefore, the above-described polarization conversion element 14 is desirably configured to convert the light into linearly polarized light (p-polarized light: polarized light parallel to the page) oscillating in a plane horizontal to the road surface from the visible light lighting unit 10 as shown in FIG. 13(*a*). In this embodiment, as shown in FIG. 13(*b*), the polarization conversion element 14 is configured by combining a plurality of translucent members 141 having a columnar shape whose cross section is parallelogramic (hereinafter, parallelogram column) and a plurality of translucent members 142 having a columnar shape whose cross section is triangular (hereinafter, triangular column) so as to be arranged in an array in parallel to the plane perpendicular to the light axis of the parallel light from the collimator unit 13. Further, at the interfaces between the adjacent translucent members arranged in an array, a PBS film and a reflection film are alternately provided, and the p-polarized light can be emitted by providing a half wave plate 143 on an emission surface from which the light which has been incident on the polarization conversion element 14 and has been reflected on the PBS film is emitted.

Figure 14:
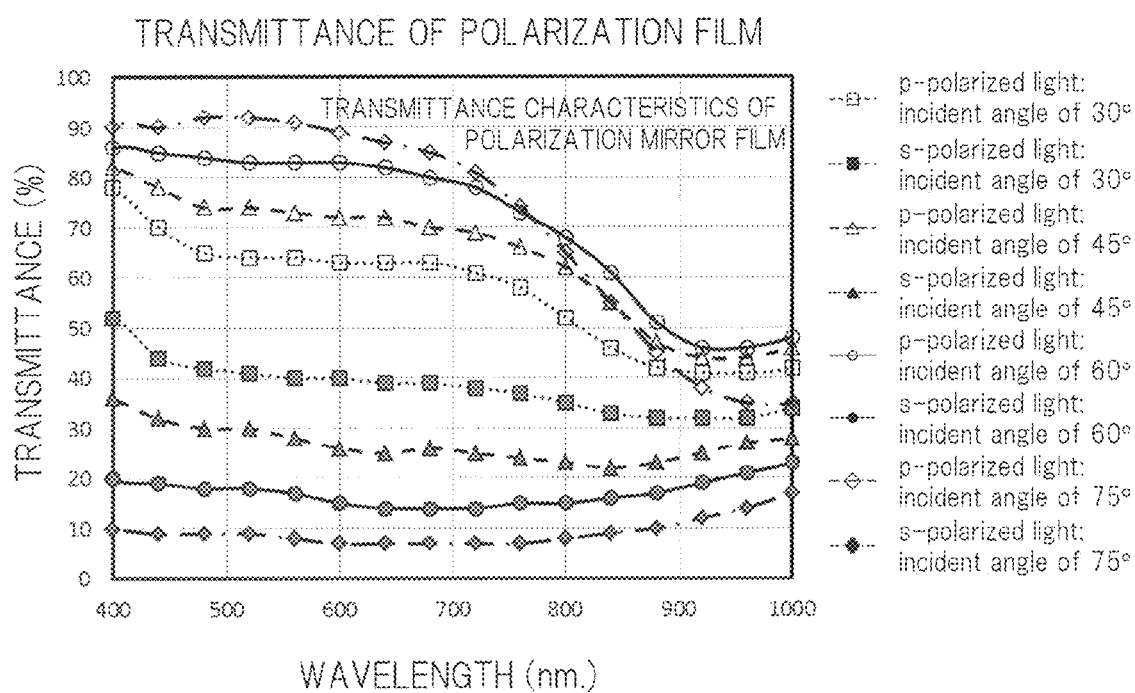
FIG. 14 is a graph showing a polarization film transmittance with respect to a wavelength of incident light of a polarization mirror for s-polarized light and p-polarized light having different incident angles in the vehicle headlight device according to the second embodiment of the present invention.

Meanwhile, the polarization mirror 30 (see FIG. 12) is attached so that the emission surface thereof is inclined downward by an angle θo of 45 degrees or more, more preferably, 60 degrees with respect to the light axis. In this embodiment, the angle θo is set to 60 degrees (θo=60°) as shown in FIG. 12. Note that, by setting the inclination angle θo of the polarization mirror 30 to 45 degrees or more, the reflectance of the s-polarized light incident from the outside can be increased while maintaining the high transmittance of the p-polarized light of the polarization mirror 30. Further, by inclining the emission surface of the polarization mirror 30 downward with respect to the light axis instead of upward, it is possible to set the larger angle θs of the normal surface of the polarization mirror to sunlight which is incident from above with respect to the horizontal (light axis) direction as shown in the figure. FIG. 14 shows polarization film transmittance characteristics of the film designed as the polarization mirror 30. It can be understood that the transmittance of the s-polarized light is selectively decreased by the polarization mirror and the effect thereof becomes greater as the incident angle becomes larger. Accordingly, the transmittance of the s-polarization component in sunlight is lowered by the polarization mirror 30, the intensity of sunlight reaching the LCD panel 20 is weakened, and the burning and characteristic deterioration of the LCD panel 20 due to sunlight are prevented/suppressed.

Figure 15:
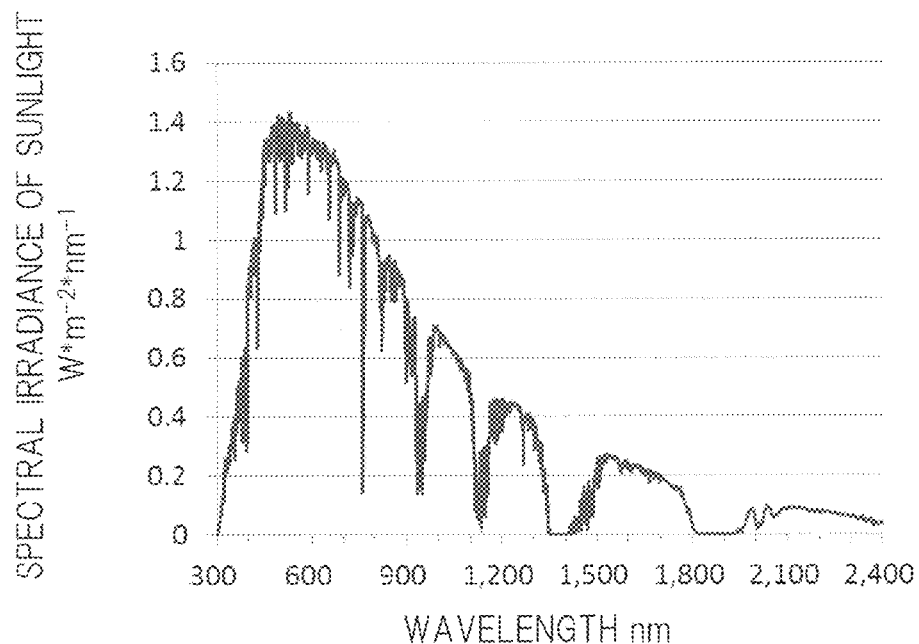
FIG. 15 is a characteristic diagram showing spectral irradiance of sunlight in the vehicle headlight device according to the second embodiment of the present invention.

As shown in FIG. 15, the spectral radiation energy of sunlight has sufficient energy in the region other than the visible light region from 380 nm to 780 nm, particularly in the near infrared and infrared regions of the wavelength region of 780 nm or more. Therefore, by making the polarization mirror 30 have the characteristics of low transmittance for the infrared light, it is possible to further prevent the burning and characteristic deterioration due to sunlight by reducing the infrared component contained in sunlight. Also, since a plate thickness t of the polarization mirror 30 arranged to be inclined sometimes becomes a factor to cause coma and astigmatism, the plate thickness t is preferably 1.5 mm or less and 0.6 mm or more in terms of strength.

In addition, when the LCD panel 20 is provided as described above, the free-form surface of the free-form surface lens 15 provided on the emission surface side of the polarization conversion element 14 in the visible light lighting unit 10 is set so as to collect the light in such a manner that the distribution of the light incident on the LCD panel 20 is intensified at the central portion thereof. Consequently, the distant lighting of the illumination light required in the headlight device can be achieved.

With the headlight device described above in detail, the emission light from the LED 111 is converted into substantially parallel light by the collimator unit 13 and is further converted into s-polarized light parallel to the page by the polarization conversion element 14. This emission light is collected by the free-form surface lens 15 so that the light intensity at the central portion thereof is increased, and is then applied to the LCD panel 20. Further, the light is converted into image light of various types of information by light modulation while passing through the LCD panel 20, and is then emitted to the polarization mirror 30. At that time, since the s-polarized light converted by the polarization conversion element 14 is converted into p-polarized light by the LCD panel 20, the light efficiently passes through the polarization mirror 30, specifically, 80% or more of the light passes through the polarization mirror 30. The light that has passed through the polarization mirror 30 is enlarged and projected by the projection lens 50 and is applied to the road surface and/or the front space.

Here, as shown in FIG. 12, it is also possible to further provide an infrared lighting unit 40 that emits infrared light in addition to the LCD panel 20 described above. Note that the infrared lighting unit 40 is configured to emit the infrared light for an infrared sensor (not shown here) that detects the state outside the vehicle in the nighttime. In the embodiment shown in the figures, the headlight device uses the polarization mirror 30 to superimpose the infrared light from the infrared lighting unit 40 onto the illumination light from the visible light lighting unit 10, thereby applying the illumination light onto the road surface in front of the vehicle.

Figure 16:
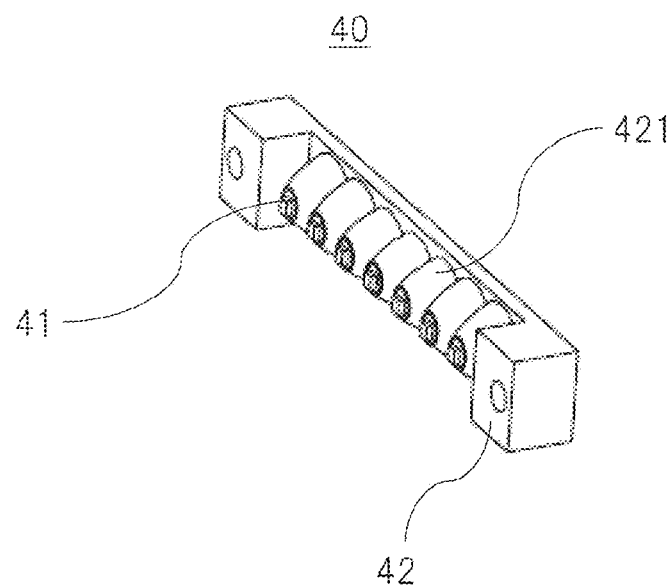
FIG. 16 is a perspective view showing an overall configuration of an infrared lighting unit in the vehicle headlight device according to the second embodiment of the present invention.

As shown in FIG. 16, the infrared lighting unit 40 is configured by attaching one or a plurality of semiconductor infrared LEDs (Light Emitting Diodes) 41 which are solid light sources to an infrared LED collimator unit 42 as in the visible light lighting unit described above. In the embodiment shown in the figure, the case in which a plurality of (seven) infrared LEDs 41 are arranged in a row and each of the infrared LEDs 41 is fixed so as to be located at the central portion of a concave portion (see a reference character 134 of FIG. 6) of an infrared LED collimator 421 constituting the infrared LED collimator unit 42 is shown as an example. Though not shown here, it is obvious for a person having ordinary skill in the art that the infrared LED 41 is also arranged on a board having a control circuit or the like thereon like the LED 111 described above and a heat sink for dissipating heat from the LED to ambient air is attached to a rear surface of the board.

As can be seen from FIG. 12, the infrared lighting unit 40 is disposed by the use of the polarization mirror 30 described above. Namely, as an example, the infrared lighting unit 40 is disposed below the light axis of the polarization mirror 30 attached so that the emission surface thereof is inclined by a desired angle with respect to the light axis. Consequently, the infrared light emitted from the infrared LED 41 is reflected on the surface of the polarization mirror 30, is superimposed on the illumination light from the visible light lighting unit 10, and is applied to the road surface in front of the vehicle. At that time, it is desired to set the installation angle at which the component of sunlight reflected by the polarization mirror 30 is not incident on the infrared lighting unit 40.

According to the second embodiment described above in detail, by mounting the infrared lighting unit capable of emitting the infrared light together with the LCD panel which enables the light distribution control while preventing the deterioration due to sunlight, it is possible to realize the effect that the headlight device with higher functionality can be manufactured at low cost and the size reduction and modularization thereof are facilitated as in the first embodiment described above.

Third Embodiment

Figure 17:
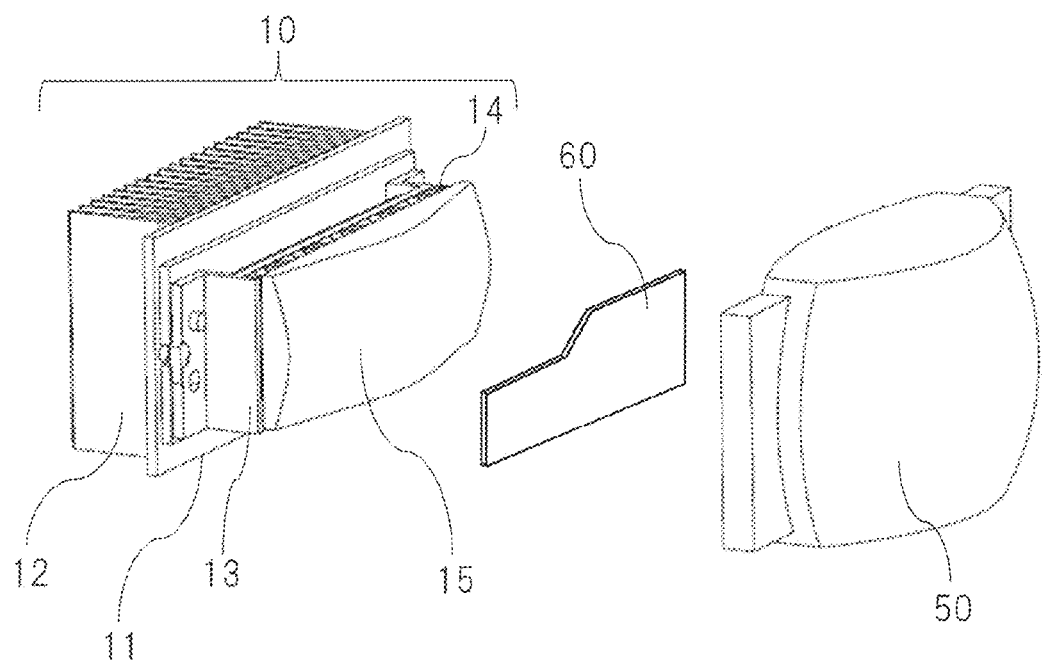
Figure 17:
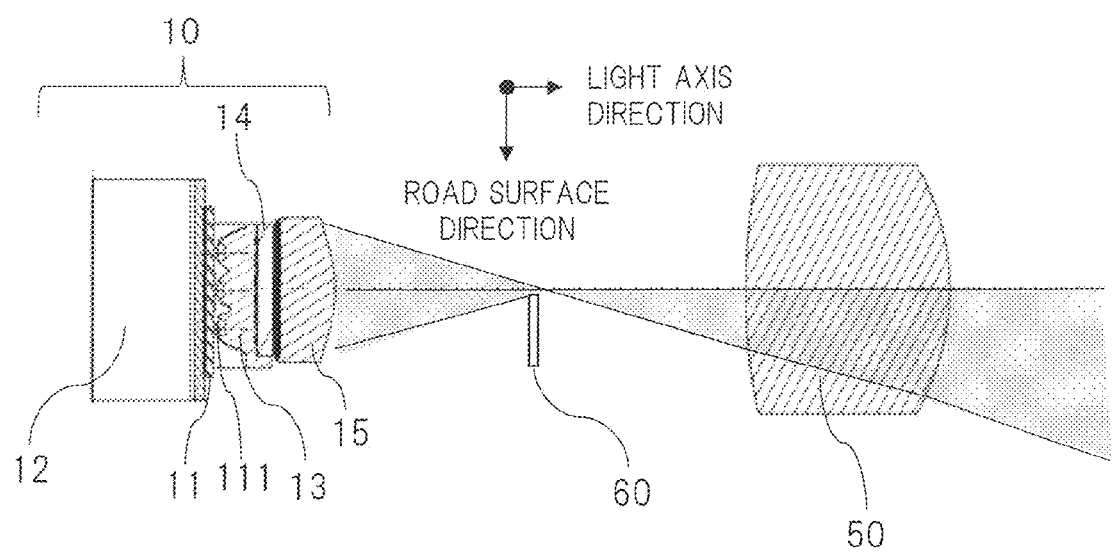

Further, FIG. 17 shows a configuration example in which a shade is provided inside the headlight device in addition to the configuration of the first or second embodiment described above. Note that the shade 60 enables to form the headlight cut-off line (light distribution) required for the passing beam (so-called low beam) from the vehicle headlamp when vehicles pass by each other. As shown in the figure, the shade 60 is configured of a light-shielding member formed into a predetermined shape, and is disposed and fixed in the vicinity of the focal point of the projection lens 50.

With the shade 60 described above, a lighting pattern of illumination light such as the cut-off line required for the passing beam (so-called low beam) can be formed by blocking a part of the illumination light from the visible light lighting unit 10. Note that, though not shown here, the shade 60 may be commonly used for driving beam (so-called high beam) by providing a rotation mechanism such as an electric motor to make the position thereof movable, other than the fixed type shown in the figure.

As described above, according to the third embodiment, the headlight device having still higher functionality can be manufactured at low cost, and the headlight device can be reduced in size and easily modularized.

Fourth Embodiment

Further, FIG. 18 shows a configuration example in which the visible light lighting unit 10 which is a light source device is small with respect to the LCD panel 20, as a modification of the configuration of the embodiment described above.

When the visible light lighting unit 10 is small with respect to the LCD panel 20, it is necessary that the substantially parallel light emitted from the polarization conversion element 14 is narrowed by the free-form surface lens 15 in accordance with the size of the LCD panel 20. In FIG. 18, the narrowing is realized by forming the incident surface and the emission surface of the free-form surface lens 15 to have convex shape and increasing the distance between the polarization conversion element 14 and the LCD panel 20. Further, in order to apply the light from the small LCD panel 20 with a wide distribution angle through the projection lens 50, the focal length of the projection lens 50 is shortened and the distance between the LCD panel 20 and the projection lens 50 is reduced.

As described above, according to the fourth embodiment, the headlight device with higher functionality can be manufactured at low cost by using a smaller LCD panel, and the headlight device can be reduced in size and easily modularized. Also, with the vehicle headlight device according to the present invention described above in detail, it is possible to realize a low power consumption and long-life vehicle headlight device excellent for environmental protection and having high light use efficiency.

In the foregoing, the vehicle headlight device according to various embodiments of the present invention has been described. However, the invention is not limited to the embodiments described above and includes various modifications. For example, the embodiments above have described the overall system in detail for easy description of the present invention, and the present invention is not always limited to those including all of the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

REFERENCE SIGNS LIST

100: headlight device, 10: visible light lighting unit, 11: LED board, 111: LED, 12: heat sink, 13: collimator unit, 131: collimator, 132: outer peripheral surface, 133: convex portion (convex lens surface), 134: concave portion, 135: convex lens surface, 14: polarization conversion element, 143: half wave plate, 15: free-form surface lens, 20: polarization direction conversion device (TN LCD panel (liquid crystal panel)), 30: polarization mirror, 40: infrared lighting unit, 41: infrared LED, 42: infrared LED collimator unit, 50: projection lens, 60: reflection mirror, 111: road, 110: automobile, 113: forward-monitoring camera, 115: irradiation region of headlight device near its own vehicle, 116-1: irradiation region of headlight device distant from its own vehicle (before control), 116-2: irradiation region of headlight device distant from its own vehicle (after control), 117: forward vehicle

The invention claimed is:

1. A vehicle headlight device attached to a part of a vehicle and configured to apply illumination light to a road surface on which the vehicle runs, the vehicle headlight device comprising:
    a light source device configured to generate the illumination light;
    an optical unit disposed on a light axis of the light source device and configured to project the illumination light from the light source device so as to form a desired light distribution; and
    a polarization direction conversion device disposed in a part of a light path between the light source device and the optical unit and being able to control the illumination light from the light source device with inclusion of conversion of a polarization direction thereof for each irradiation region in accordance with a state of a position irradiated with the illumination light on the road surface.

2. The headlight device according to claim 1,
    wherein the polarization direction conversion device is configured of a TN (Twisted Nematic) LCD (Liquid Crystal Display).

3. The headlight device according to claim 1,
wherein the polarization direction conversion device is configured of a TFT (Thin Film Transistor) LCD (Liquid Crystal Display).

4. The headlight device according to claim 2,
wherein the LCD constituting the polarization direction conversion device has a structure in which a polarization plate is not disposed on an emission side.

5. The headlight device according to claim 2,
wherein a polarization plate on an emission side of the LCD constituting the polarization direction conversion device has a light shielding rate for polarized light smaller than that of a polarization plate on an incident side.

6. The headlight device according to claim 2,
wherein the LCD constituting the polarization direction conversion device is a color liquid crystal display element.

7. The headlight device according to claim 2,
wherein the optical unit is configured of either of a projection lens or a reflection mirror or both of them.

8. The headlight device according to claim 1,
wherein the light source device includes:
one or a plurality of semiconductor light source elements configured to emit light; and
a collimator unit having one or a plurality of collimators disposed on a light emission axis of each of the semiconductor light source elements and configured to convert light emitted from a solid light source into substantially parallel light.

9. The headlight device according to claim 1,
wherein a polarization plate or mirror is further disposed between the polarization direction conversion device and the optical unit so that an emission surface thereof is inclined downward by a predetermined angle.

10. The headlight device according to claim 1, further comprising
a free-form surface lens provided on an emission surface side of the light source device.

11. The headlight device according to claim 1, further comprising
an infrared light emitting unit configured to generate infrared light.

12. The headlight device according to claim 11,
wherein the infrared light emitting unit includes one or a plurality of semiconductor infrared elements configured to emit the infrared light and an infrared collimator unit having one or a plurality of infrared collimators disposed on a light emission axis of each of the semiconductor infrared elements and configured to convert light emitted from the semiconductor infrared element into substantially parallel light.

13. The headlight device according to claim 12, further comprising
a polarization mirror disposed between the polarization direction conversion device and the optical unit so that an emission surface thereof is inclined downward by a predetermined angle,
wherein the infrared light emitting unit is configured so that the emitted infrared light is reflected on an emission surface of the polarization mirror and is applied in a predetermined direction through the optical unit.

14. The headlight device according to claim 3,
wherein the LCD constituting the polarization direction conversion device has a structure in which a polarization plate is not disposed on an emission side.

15. The headlight device according to claim 3,
wherein a polarization plate on an emission side of the LCD constituting the polarization direction conversion device has a light shielding rate for polarized light smaller than that of a polarization plate on an incident side.

16. The headlight device according to claim 3,
wherein the LCD constituting the polarization direction conversion device is a color liquid crystal display element.

17. The headlight device according to claim 3,
wherein the optical unit is configured of either of a projection lens or a reflection mirror or both of them.

* * * * *